UNITED STATES PATENT OFFICE.

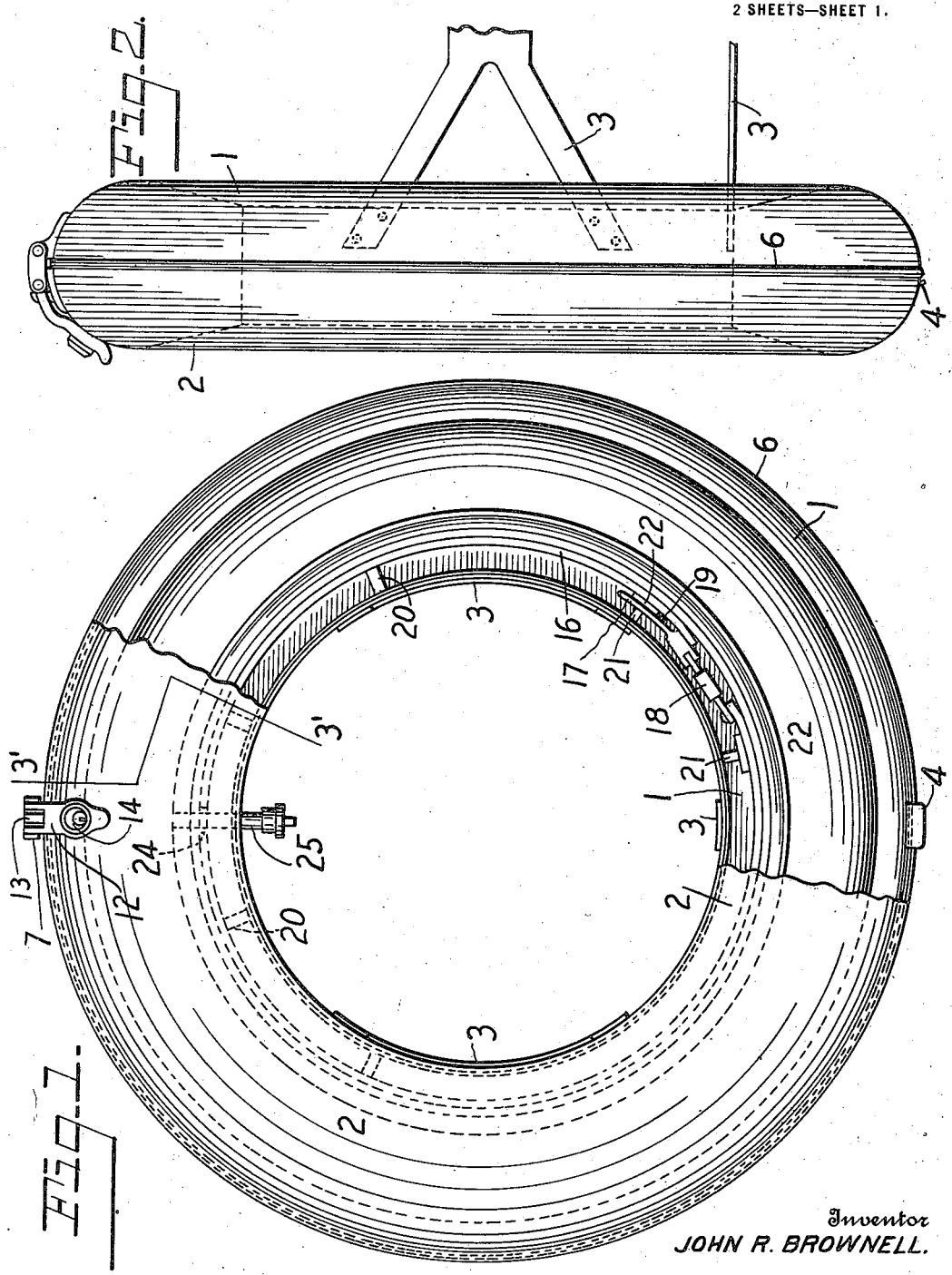

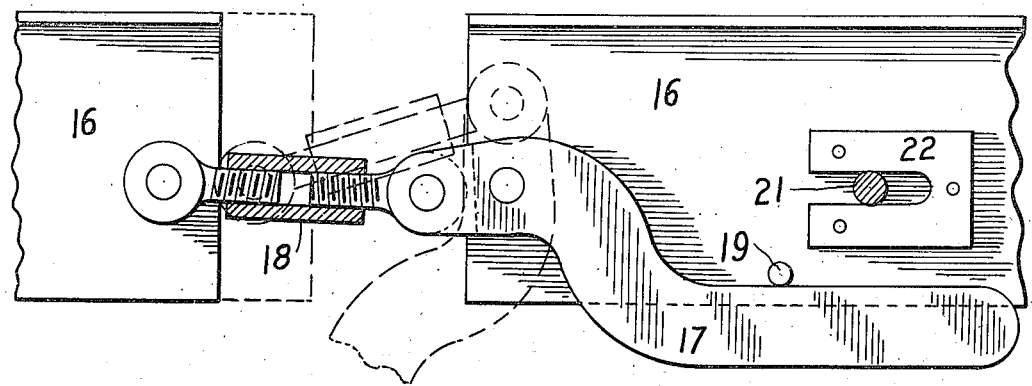
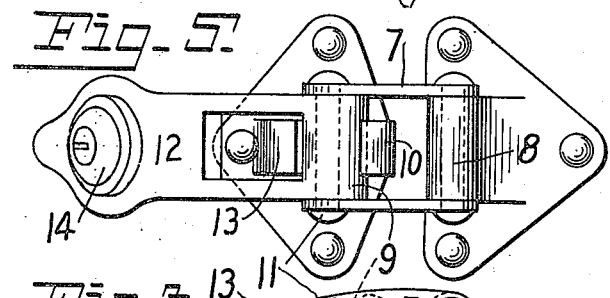
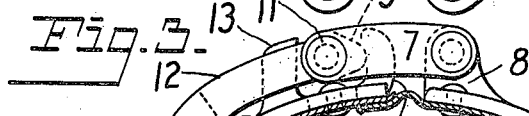
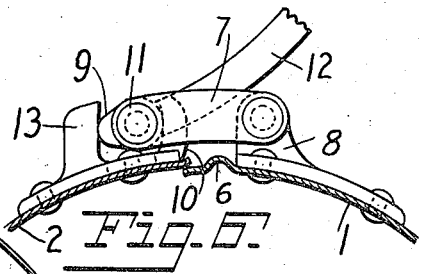
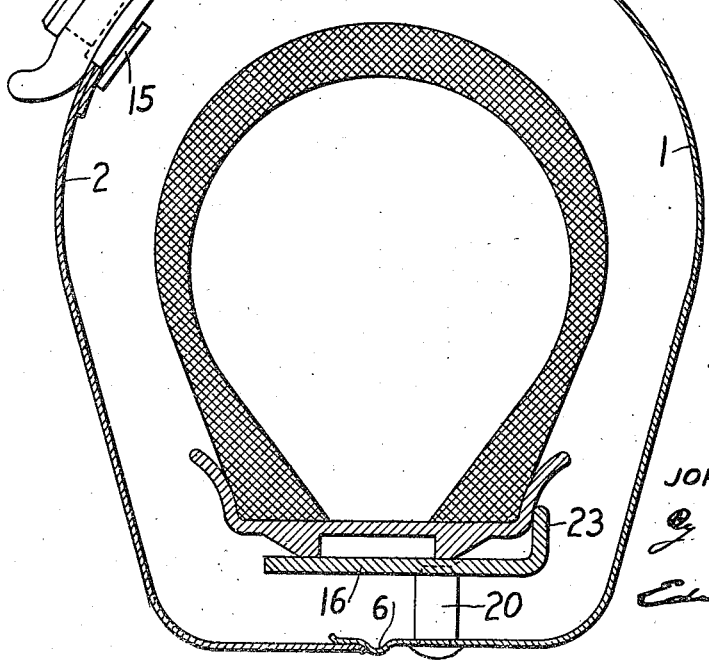
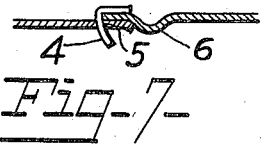

JOHN R. BROWNELL, OF DAYTON, OHIO.

COMBINED TIRE CARRIER AND CASING.

1,426,455.           Specification of Letters Patent.    Patented Aug. 22, 1922.

Application filed June 20, 1921. Serial No. 478,911.

*To all whom it may concern:*

Be it known that I, JOHN R. BROWNELL, a citizen of the United States, residing at Dayton, in the county of Montgomery and State of Ohio, have invented certain new and useful Improvements in Combined Tire Carriers and Casings, of which the following is a specification, reference being had therein to the accompanying drawing.

This invention relates to a combined tire carrier and casing.

One object of the invention is to provide a combined tire carrier and casing comprising two parts which may be easily separated to permit the removal and insertion of a tire and which will normally be held snugly in contact one with the other to prevent rattling.

A further object of the invention is to provide such a combined tire carrier and casing with means for rigidly supporting the tire within the same.

A further object of the invention is to provide such a combined tire carrier and casing having a connecting device for securing the parts thereof one to the other and for locking said parts together.

Other objects of the invention will appear as the device is described in detail.

In the accompanying drawings Fig. 1 is a front elevation, partly broken away of a combined tire carrier and casing embodying my invention; Fig. 2 is an edge view of the same; Fig. 3 is a section taken on the line 3—3 of Fig. 1; Fig. 4 is a detail view of the operating device for the expansible tire supporting member; Fig. 5 is a plan view of the connecting device for the two sections of the casing; Fig. 6 is a side elevation of the connecting device; and Fig. 7 is a fractional detail view of a portion of the casing showing the hinged connection between the two sections.

In these drawings I have illustrated one embodiment of my invention and have shown the combined tire carrier and casing as comprising two annular sections, 1 and 2, which are concavo-convex in cross section and are adapted to be arranged with the concave faces adjacent one to the other. The size and shape of the casing is such that it will receive between the two sections thereof an automobile tire of standard construction. It will be understood that the casing may be made in different sizes to adapt it to tires of different sizes and that the cross sectional shape may be varied from that here shown. One section of the casing is adapted to be secured to an automobile, or other suitable supporting structure, in any suitable manner, as by means of brackets 3. The other section, in the present instance, the front section 2, is separably connected with the rear, or fixed, section 1 and preferably the connection between the two sections is such that the front section may not only be moved away from the rear section to permit of the removal or insertion of a tire but that it may be wholly detached from the rear section to permit it to be laid to one side where it will not interfere with the handling of the tire, which in many cases is quite heavy. To this end I have hinged together the two sections of the casing at one edge thereof and have utilized a separable hinge so that after the front section has been moved away from the rear section it can be disconnected therefrom. In the present construction the edges of the two sections are so arranged that the front section will overlap the edge of the rear section and I have secured to the edge of the rear section a lug, or hinge member, 4 which projects downwardly and rearwardly. The adjacent edge of the front section is provided with an opening, as shown at 5, through which this lug, or hinge member, extends, thus forming a pivotal connection between the two parts. The rear section may, if desired, be provided with a projection or bead 6 near the edge thereof with which the edge of the front section will engage with a wedging action when the front section has been moved into engagement with the rear section, thus forming a snug, tight connection between the two parts which will not rattle.

A suitable connecting device is provided for drawing the two sections firmly together and holding them in that position and this connecting device is arranged at a point remote from the hinged connection. In the present instance the hinged connection is at the bottom of the casing and the connecting device at the top. The particular connecting device here shown comprises a connecting arm, such as a pair of links, 7 pivotally mounted on a lug 8 rigidly secured to the rear section 1 near the edge thereof but in the rear of the bead 6. In this connection it will be understood that the bead 6 may extend entirely about the section 1 or it may be formed in two parts located adjacent to the respective connecting devices. The arm, or link, 7 has mounted thereon a cam 9 which is arranged to engage the outer face of a lug 10 rigidly secured to the front section 2 near the edge thereof and means are provided for actuating this cam to cause it to act upon the lug 10 and force the front section toward the rear section and thus bring the overlapping parts into firm wedging contact, which will not only effectually prevent rattling but will form a joint which is practically dust and water proof.

In the present construction the cam is mounted on a stud, or shaft, 11 and an operating lever 12 is secured to this stud for actuating the cam. I have also mounted on the front section 2 a second lug 13 which is arranged on that side of the cam opposite the lug 10 so that it may be engaged by the cam, when the operating lever is moved to its rearward position, and the front section moved away from the rear section, thus providing means to forcibly separate the two sections of the casing in case they should stick together or bind in such a manner as to make the separation difficult. I have also provided means for locking the cam in operative engagement with the lug 10 so as to prevent the separation of the two parts of the casing and the removal of the tire by unauthorized persons. As here shown, the lever 12 has mounted therein a key operated lock, 14, the inner end of which extends through an opening in the wall of the casing and is provided with a locking member 15 adapted to be moved into and out of line with the edge of the casing, about the opening, thereby providing key controlled means for locking the two sections together.

I have also provided means for rigidly supporting the tire within the casing, thus causing the weight to be supported at the proper place and preventing the tire from rattling. This device may take various forms but preferably consists of an annular band 16 mounted within the casing and adapted to receive the rim of the tire. This band is expansible and is preferably split so that by moving the end portions thereof toward and from one another it may be contracted or expanded. A suitable device is provided for connecting the ends of the split band one to the other and for operating the same to expand or contract the band, and, as here shown, this device comprises a toggle the two arms of which are pivotally mounted on the adjacent ends of the band and one arm of which is provided with an extension 17 forming a handle by means of which the toggle may be manipulated. One arm of the toggle is made in two parts which are connected by a turn buckle 18, thereby permitting the link of the toggle to be adjusted to cause the band to tightly grip the rim of the tire when the toggle is in its straight position. To retain the band in its expanded position I have provided means such as a stop 19, for so limiting the movement of the handle 17 that the pivotal connection between the two arms of the toggle will lie just beyond a line extending through the pivotal connections of the two arms of the toggle with the respective ends of the band. Consequently, when the toggle is moved into its extended position it will be automatically locked in that position. The supporting band may be attached to the casing in various ways but in the present construction I have connected it to the inner flange of the rear section of the casing by means of a series of studs 20 which are arranged about the upper portion of the casing, at which point the weight of the tire is supported. The band is severed, or split, at a point remote from these connecting studs so that a relatively large portion of the same is free to move relatively to the casing and to rim of the tire. The end portions of the band are guided by studs 21 carried by the inner flange of the rear section of the casing and extending into slotted brackets, or guide plates, 22 secured to the adjacent surface of the band, thus permitting the two ends of the band to be moved toward or from each other by the manipulation of the toggle. The band may also be provided at its rear edge with a flange 23 which will serve to limit the rearward movement of the tire and properly position the same thereon. The band is slotted, as shown at 24 to receive the valve stem 25 which also extends through a slot in the inner flange of the rear wall of the casing.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a device of the character described, a closed casing comprising two circular sections, one of which is movable toward and from the other, an annular tire supporting band arranged within said casing, having its upper portion rigidly secured to one section of said casing and having its lower portion severed transversely, the lower portions of said band being movable relatively to said casing, and means for moving the ends of said band toward and from each other to contract and expand the band.

2. In a device of the character described, a closed casing comprising two circular sections, one of which is movable toward and from the other, an annular tire supporting band arranged within said casing, rigidly secured to the inner circumferential wall of one section of said casing above the horizontal diameter thereof and severed transversely at a point below and spaced from said diameter, the lower portions of said band being movable relatively to said casing, and means for moving the end portions of said band toward and from each other, to contract and expand the band.

3. In a device of the character described, a closed casing comprising two circular sections, one of which is movable toward and from the other, an annular tire supporting band arranged within said casing, rigidly secured to the inner circumferential wall of one section of said casing above the horizontal diameter thereof and severed transversely at a point below and spaced from said diameter, the lower portions of said band being movable relatively to said casing, means for slidably connecting the end portions of said band with said circumferential portion of said casing section, and means for moving the end portions of said band toward and from each other to contract and expand said band.

4. In a device of the character described, a closed casing comprising two circular sections, one of which is movable toward and from the other, an annular tire supporting band arranged within said casing, rigidly secured to the inner circumferential wall of one section of said casing above the horizontal diameter thereof and severed transversely at a point below and spaced from said diameter, the lower portions of said band being movable relatively to said casing, the end portions of said band having guideways near the ends thereof, studs rigidly secured to said wall of said casing section and extending into said guideways, and means for moving the end portions of said band toward and from each other to contract and expand the band.

5. A casing for a tire or the like comprising two annular sections, concavo-convex in cross section, and adapted to be arranged with their concave faces adjacent one to the other, a lug carried by one of said sections, a connecting member carried by the other section and comprising an arm, and a part controlled by said arm to engage said lug and clamp said sections in firm engagement one with the other, and a key controlled device carried by said arm and adapted to enter an opening in said casing to lock said part in operative engagement with said lug.

6. A casing for a tire or the like comprising two annular sections concavo-convex in cross section and adapted to be arranged with their concave faces adjacent one to the other, a lug carried by one of said sections, a connecting member carried by the other section, a cam carried by said connecting member and arranged to engage said lug, and means for actuating said cam to draw one of said sections into contact with the other.

7. A casing for a tire or the like comprising two annular sections concavo-convex in cross section and adapted to be arranged with their concave faces adjacent one to the other, a lug carried by one of said sections, a connecting arm pivotally mounted on the other section, a cam rotatably mounted on said arm and adapted to be moved into line with said lug, an operating member connected with said cam to rotate the same into engagement with said lug and force the one section toward the other.

8. A casing for a tire or the like comprising two annular sections concavo-convex in cross section and adapted to be arranged with their concave faces adjacent one to the other, lugs carried by one of said sections, a connecting member carried by the other of said sections, and a part carried by said connecting member, and adapted to act on said lugs to move the one section toward and from the other section.

9. A casing for a tire or the like comprising two annular sections concavo-convex in cross section and adapted to be arranged with their concave faces adjacent one to the other, lugs carried by one of said sections, a connecting member carried by the other of said sections, a cam rotatably mounted on said connecting member and adapted to be arranged between said lugs, and means for rotating said cam to cause it to act on one or the other of said lugs to move the one section of said casing relatively to the other.

10. A casing for a tire or the like comprising two annular sections, the edge of one section being arranged to overlap the edge of the other section, said other section having a portion of its surface inclined and arranged to be engaged by the edge of the first mentioned section, and means for connecting said sections one to the other and causing the first mentioned section to engage the inclined surface of the other section with a wedging action.

11. A casing for a tire or the like comprising two annular sections, the edge of one of which is adapted to overlap the edge of the other, the last mentioned section having a bead extending about the outer surface thereof near its edge, a separable hinged connection between said sections on one side of said casing, and a connecting device arranged on that side of said casing opposite said hinged connection and having means to forcibly move the one section toward the other.

In testimony whereof, I affix my signature hereto.

JOHN R. BROWNELL.